United States Patent
Persson et al.

(10) Patent No.: US 8,914,020 B2
(45) Date of Patent: Dec. 16, 2014

(54) METHODS AND ARRANGEMENTS IN WIRELESS COMMUNICATION SYSTEMS

(75) Inventors: Håkan Persson, Solna (SE); Henrik Enbuske, Stockholm (SE); Håkan Palm, Växjö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 57 days.

(21) Appl. No.: 13/704,017

(22) PCT Filed: May 23, 2011

(86) PCT No.: PCT/SE2011/050639
§ 371 (c)(1),
(2), (4) Date: Dec. 13, 2012

(87) PCT Pub. No.: WO2011/162668
PCT Pub. Date: Dec. 29, 2011

(65) Prior Publication Data
US 2013/0090113 A1 Apr. 11, 2013

Related U.S. Application Data

(60) Provisional application No. 61/356,834, filed on Jun. 21, 2010.

(51) Int. Cl.
| | | |
|---|---|---|
| *H04W 24/00* | (2009.01) | |
| *H04W 24/10* | (2009.01) | |
| *H04W 48/18* | (2009.01) | |
| *H04W 88/06* | (2009.01) | |

(52) U.S. Cl.
CPC .............. *H04W 24/10* (2013.01); *H04W 48/18* (2013.01); *H04W 88/06* (2013.01)
USPC ..... 455/424; 455/436; 455/426.1; 455/452.1; 455/69

(58) Field of Classification Search
USPC .............. 455/424, 426.1, 67.7, 68, 69, 452.1; 370/320
See application file for complete search history.

(56) References Cited

U.S. PATENT DOCUMENTS

2007/0237167 A1* 10/2007 Kaneko et al. ................. 370/437
2009/0191862 A1* 7/2009 Amirijoo et al. .............. 455/424

(Continued)

FOREIGN PATENT DOCUMENTS

| EP | 1675305 A1 | 6/2006 | |
|---|---|---|---|
| EP | 2384050 | * 4/2010 | ............ H04W 36/00 |
| WO | 2006063309 A2 | 6/2006 | |

OTHER PUBLICATIONS

Ericsson; "Triggers for Logged MDT Measurement Reporting"; 3GPP TSG-RAN WG2 #69, San Francisco, USA; Feb. 22-26, 2010; pp. 1-3; Tdoc R2-101426; 3GPP, Mobile Competence Centre, 650, route des Lucioles, 06921 Sophia-Antipolis Cedex, France.
Ericsson et al; "Multi-RAT and Mobility Handling"; 3GPP TSG-RAN WG2 #70bis, Stockholm, Sweden, Jun. 28-Jul. 2, 2010; pp. 1-2; Tdoc R2-103876; 3GPP, Mobile Competence Centre, 650, route des Lucioles, 06921 Sophia-Antipolis Cedex, France.

(Continued)

*Primary Examiner* — Kashif Siddiqui
*Assistant Examiner* — Mong-Thuy Tran
(74) *Attorney, Agent, or Firm* — Coats and Bennett, PLLC

(57) ABSTRACT

Methods and arrangements for reporting of measurement information from a user equipment to a receiving entity via a network node comprised in a wireless communication system are disclosed. The embodiments relate to measurement logging function and immediate reporting function called Minimizing Drive Tests (MDT). The problem of reporting measurements in another RAT than in the RAT in which the measurements were collected in is addressed by a solution where a UE includes the measurement information collected in a first RAT in a message which is sent 36 to a network node in a second RAT. The network node then forwards 37 the message to a receiving entity without having to decode the actual content of the measurement log. This is done by introducing the receiving entity's IP address and/or similar addressing information in an address field in the message and using a container structure where the actual measurement log as reported by the UE is placed. The container need not be understandable by the network node and could be of a message format used in the RAT where the UE collected the measurement log. Thus, there is no need to reformat the measurement results.

36 Claims, 8 Drawing Sheets

(56) References Cited

U.S. PATENT DOCUMENTS

| | | | |
|---|---|---|---|
| 2009/0303991 A1* | 12/2009 | Kappler et al. | 370/389 |
| 2010/0067433 A1* | 3/2010 | Cheng et al. | 370/320 |
| 2010/0067434 A1* | 3/2010 | Siu et al. | 370/328 |
| 2010/0290429 A1* | 11/2010 | Wu | 370/331 |
| 2010/0304769 A1* | 12/2010 | Fellows et al. | 455/507 |
| 2011/0014919 A1* | 1/2011 | Otte et al. | 455/442 |
| 2011/0194530 A1* | 8/2011 | Tinnakornsrisuphap et al. | 370/331 |

OTHER PUBLICATIONS

3GPP; "Radio Measurement Collection for Minimization of Drive Tests (MDT); Overall Description; Stage 2"; 3GPP TS 37.370; v.0.5.0.

3GPP; "Radio Measurement Collection for Minimization of Drive Tests (MDT); Overall Description; Stage 2"; 3GPP TS 37.320 version 10.4.0 Release 10) pp. 1-20; ETSI 650 Route des Lucioles Sophia Antipolis Cedex, France, Apr. 2011.

* cited by examiner

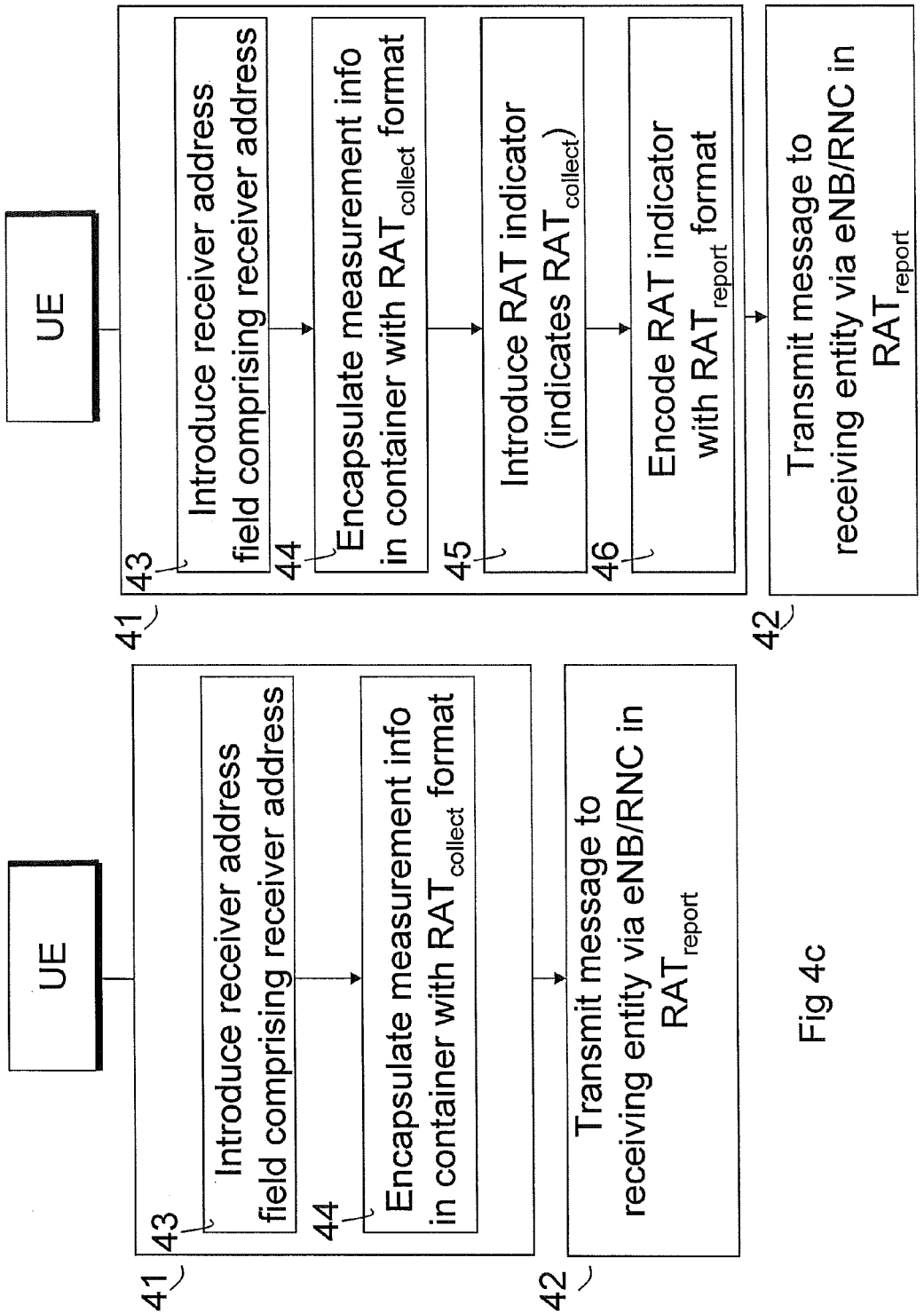

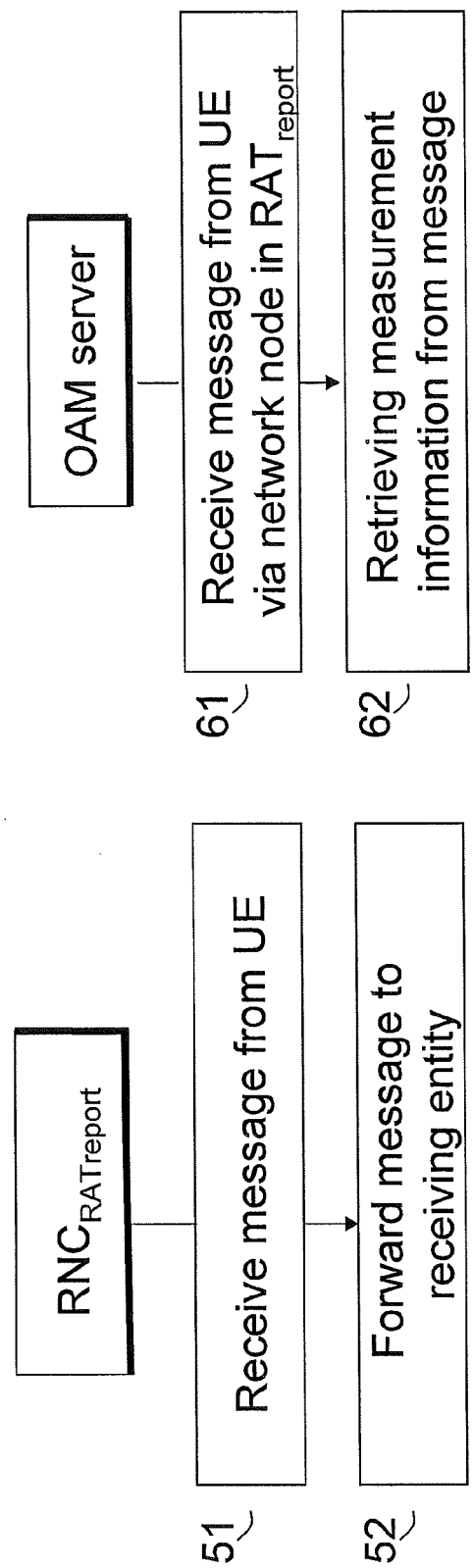

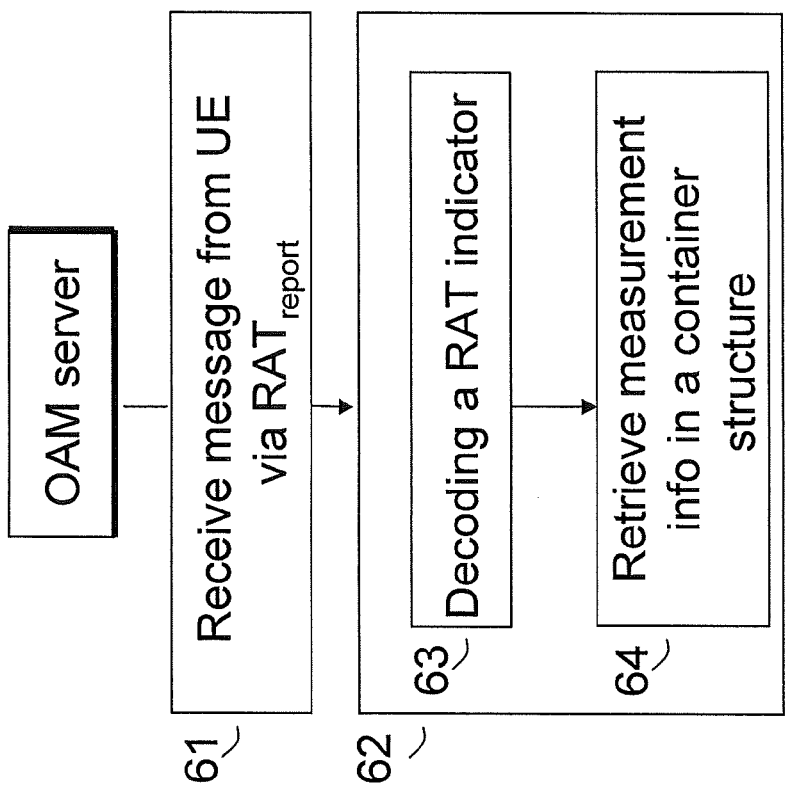
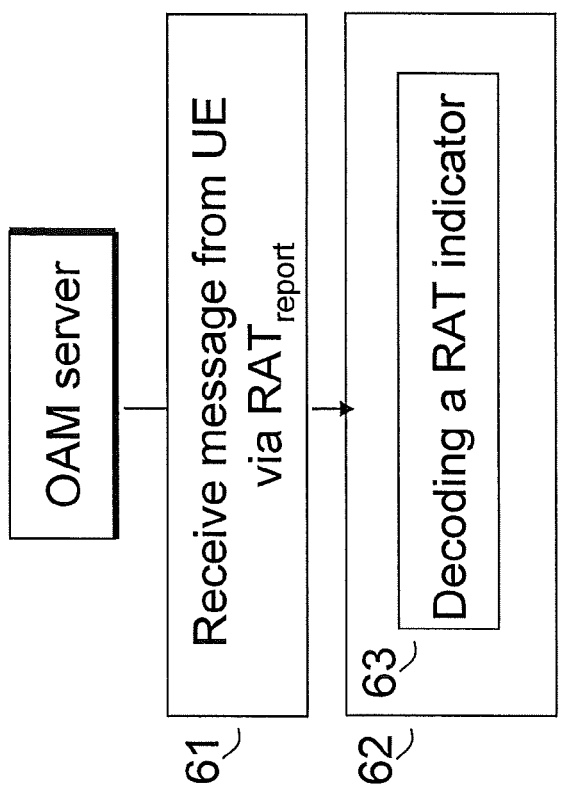
Fig 6c
Fig 6b

METHODS AND ARRANGEMENTS IN WIRELESS COMMUNICATION SYSTEMS

TECHNICAL FIELD

The present disclosure relates to reporting measurement data. More particularly, the present disclosure relates to arrangements and methods for reporting of measurement data from a user equipment to a receiving entity via a network node comprised in a wireless communication system.

BACKGROUND

For next generation of mobile telecommunications systems the $3^{rd}$ Generation Partnership Project (3GPP) is in the process of defining solutions for user equipment (UE) measurement logging function and immediate reporting function called Minimizing Drive Tests (MDT). The MDT study aims at assessing the feasibility, benefits and complexity of automating the collection of UE measurements to minimize the need of manual drive-tests. The work under the MDT study should define use cases and requirements for minimizing drive-tests in next generation LTE/HSPA (Long Term Evolution/High Speed Packet Access) networks. Also, based on the defined use cases and requirements, the MDT should focus on study the necessity of defining new UE measurements logging and reporting capabilities for minimizing drive tests and analyze the impact on the UE.

The use cases for the MDT will be given as following.
  Radio coverage optimization
  Mobility optimization
  Network capacity optimization
  Parameterization for common channels
  Quality of Service verification The network can request the UE to perform logging of measurements. The UE executes measurements and logs these measurements internally in a sequential manner, containing e.g. some hour of logged measurement information.

When the UE has logged measurements the UE indicates to the network that it has an available measurement log. The network may then request the UE to deliver the measurement log. This prior art procedure is illustrated in FIG. 1. The UE sends 10 an indication to a network node, e.g. an eNodeB comprised in a LTE system or a RNC (Radio Network Controller) comprised in a WCDMA system, that it has an available measurement log. The network node then determines 11 whether is wants to request the measurement log. If it determines to request the measurement log it sends 12 a request to the UE. Thereupon the UE delivers 13 the measurement log to the network node. From the eNB/RNC, the received measurement log is sent to an OAM (Operation and Maintenance) or similar server (not shown) comprised in the network.

The network collects measurement logs from several UEs in different cells. By collecting and retrieving information from the measurement logs the network is able to perform optimization of radio coverage, mobility, network capacity and to perform parameterization for common channels and verification of QoS.

The current 3GPP assumptions on the measurement log feature are:
  The UE is required to maintain only one measurement log at a time.
  The measurement log only contains measurement information collected in one RAT (Radio Access Technology). The RAT being the type of radio technology used in a Radio Access Network (RAN) to access the Core Network (CN) in the wireless communication system, e.g., UMTS, GSM/EDGE, CDMA2000, WiMAX.
  If the UE is requested to start logging measurements, a previously stored measurement log in the UE is erased.

The current 3GPP assumption is that the MDT measurements are reported in the same RAT as they have been measured in. If the measurement log can only be reported in the RAT where the measurements are collected, a number of measurements can be lost or delayed for such a long time that they are not usable. The reasons why a UE may not stay in one and the same RAT are mainly related to network deployment and service provisioning. An existing operator's network is often a combination of two or three RATs and designed to work together in order to maximize the service offerings and geographical coverage area in a cost efficient way. This often means that there is not a uniform coverage of the different RATs (one RAT can have spotty coverage while the others are more globally available, e.g. because of propagation characteristics and/or service reasons). There are also various load balancing schemes used by an operator that also will make a UE move between RATs. The detailed measurements stored in the measurement log are typically RAT-specific. Consequently, the reporting of the measurements in another RAT than in which they were collected would not be understood. Moreover, it is neither possible to send the reported measurement log to another RAT to e.g. convey the information to the right place.

Another consequence of the current 3GPP assumption that the MDT measurements are reported in the same RAT as they have been measured in is, for the case where a UE has been logging measurements in one RAT, that these cannot be delivered in case the UE re-selects to another RAT. Furthermore, in case the UE is requested to perform logging of measurements in the new re-selected RAT, the measurement log stored while the UE was in the old RAT will be lost. Hence, resources are wasted.

SUMMARY

The object of the present embodiments is to address some of the problems and disadvantages outlined above, and to provide improved methods and arrangements for reporting measurement logs in a wireless communication system.

The above stated object is achieved by means of the methods and the arrangements according to the independent claims.

In accordance with a first aspect of embodiments, a method in a user equipment for reporting measurement is provided. The user equipment is configured to communicate with a wireless communication system. The method comprising including measurement information in a message, wherein the measurement information is collected in a first RAT. The method further comprising transmitting the message to a receiving entity comprised in the wireless communication system via a network node utilizing a second RAT, wherein the second RAT is different from the first RAT.

In accordance with a second aspect of embodiments, a method in a network node for reporting measurement is provided. The network node is comprised in a wireless communication system and configured to communicate with a user equipment utilizing a first RAT. The method comprising receiving a message from the user equipment, wherein the message including measurement information collected by the user equipment in a second RAT, wherein the second RAT is different from the first RAT. The method further comprising forwarding the message to a receiving entity comprised in the wireless communication system.

In accordance with a third aspect of embodiments, a method in a receiving entity for reporting measurement is provided. The receiving entity is comprised in a wireless communication system and configured to communicate with a network node comprised in the wireless communication system. The method comprising receiving a message from a user equipment via the network node utilizing a first RAT, wherein the message includes measurement information collected by the user equipment in a second RAT, wherein the second RAT is different from the first RAT. The method further comprising retrieving the measurement information from the received message.

In accordance with a fourth aspect of embodiments, a user equipment for reporting measurement is provided. The user equipment is configured to communicate with a wireless communication system. The user equipment comprises a processing unit adapted to include measurement information in a message, wherein the measurement information is collected in a first RAT. The user equipment further comprises a transceiver adapted to transmit the message to a receiving entity comprised in the wireless communication system via a network node utilizing a second RAT, wherein the second RAT is different from the first RAT.

In accordance with a fifth aspect of embodiments, a network node for reporting measurement is provided. The network node is comprised in a wireless communication system and configured to communicate with a user equipment utilizing a first RAT. The network node comprises a transceiver adapted to receive a message from the user equipment, wherein the message includes measurement information collected by the user equipment in a second RAT, wherein the second RAT is different from the first RAT. The transceiver is further adapted to forward the message to a receiving entity comprised in the wireless communication system.

In accordance with a sixth aspect of embodiments, a receiving entity for reporting measurement is provided. The receiving entity is comprised in a wireless communication system and configured to communicate with a network node comprised in the wireless communication system. The receiving entity comprises a transceiver adapted to receive a message from a user equipment via the network node utilizing a first RAT, wherein the message includes measurement information collected by the user equipment in a second RAT, wherein the second RAT is different from the first RAT. The receiving entity further comprises a processing unit adapted to retrieve the measurement information from the received message.

An advantage of particular embodiments is that they provide a solution to the stated object which prevents losses of MDT measurement log reports when a UE has moved to another RAT than the RAT in which the measurements were collected in.

A further advantage of particular embodiments is that they provide a solution which prevents additional delays of receiving MDT reports due to handover to another RAT than the RAT in which the measurements were collected in, since it can be reported in the new RAT and does not need to wait for the UE coming back to the RAT in which the measurements were collected in.

Yet an advantage of particular embodiments is that the format of the measurement log reported by a UE is specific to the RAT in which the measurements were collected in.

Yet another advantage of particular embodiments is that the network node that receives the measurement log may be able to use the measurement log for internal SON (Self-Optimizing/Organizing Network) purpose.

Yet another advantage of particular embodiments is that the network node that receives the measurement log may forward the measurement log to a receiving entity without needing to decode the content of the measurement log.

Yet another advantage of particular embodiments is that when the UE enters a new RAT the network node may request delivery of an existing measurement log, before commanding the UE to start collecting measurements and storing a new measurement log in the new RAT.

Yet another advantage of particular embodiments is that set of measurements collected by the UE in one RAT (below called $RAT_{collect}$) can in future be extended with new types of measurement, without impacting the implementation of the RAT to which UE reports the measurements (below called $RAT_{report}$).

Further advantages and features of embodiments will become apparent when reading the following detailed description in conjunction with the drawings.

BRIEF DESCRIPTION OF THE DRAWINGS

For a better understanding, reference is made to the following drawings and preferred embodiments.

FIG. 4a-4d show flowcharts of exemplary embodiments of a method in a user equipment for reporting measurements.

FIG. 5 shows a flowchart of an exemplary embodiment of a method in a network node for reporting measurements.

FIG. 6a-6c show flowcharts of exemplary embodiments of a method in a receiving entity for receiving measurement reports.

DETAILED DESCRIPTION

Figure 1:
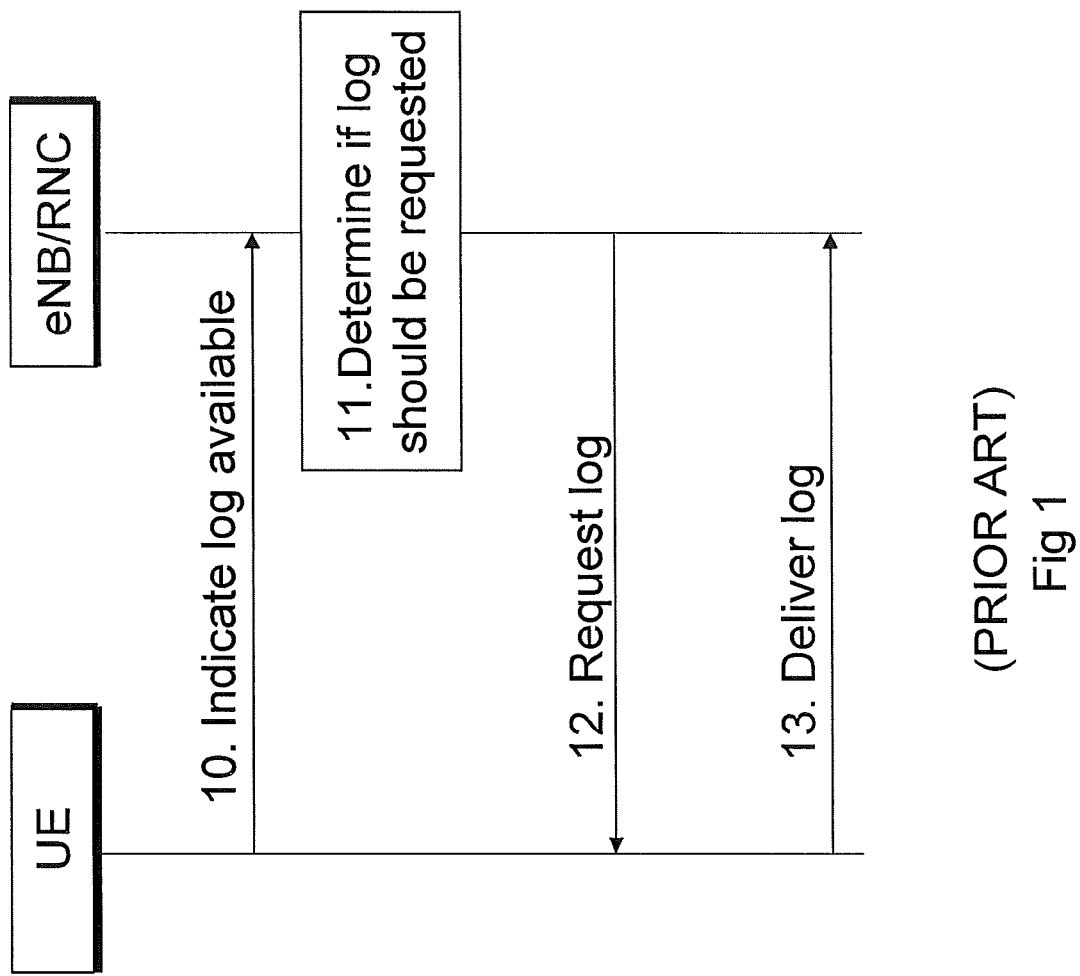
FIG. 1 illustrates the prior art procedure of reporting the measurement log from the user equipment to the network.

In the following description, for purposes of explanation and not limitation, specific details are set forth, such as particular sequences of steps and particular device configurations in order to provide a thorough understanding of the embodiments. It will be apparent to one skilled in the art that the embodiments may be practised in other embodiments that depart from these specific details. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current embodiments are primarily described in the form of methods and devices, the embodiments may also be embodied in a computer program product as well as a system comprising a computer processor and a memory coupled to the processor, wherein the memory is encoded with one or more programs that may perform the functions disclosed herein.

Embodiments are described herein by way of reference to particular example scenarios. Particular aspects are described in a non-limiting general context in relation to an LTE system, a GSM system and WCDMA system. It should though be noted that the invention and its exemplary embodiments may also be applied to other types of radio access networks for reporting measurement information.

In the following detailed description a number of embodiments are disclosed wherein the problem of reporting measurements in another RAT than in the RAT in which the measurements were collected in, is addressed by a solution where a UE includes the measurement information collected in a first RAT in a message which is sent to a network node in a second RAT. The network node then forwards the message to a receiving entity without having to decode the actual content of the measurement log. This is done by introducing a decodable address (or addresses) field, such as an IP address and/or other addressing information, and using a container structure where the actual measurement log as reported by the UE is placed. The container need not be understandable by the network node and could be of a message format used in the RAT where the UE collected the measurement log. Thus, there is no need to reformat the measurement results.

In the following detailed description the RAT in which the measurements are collected by the UE is denoted $RAT_{collect}$ and the RAT in which the measurement log is reported is denoted $RAT_{report}$. It should be noted that $RAT_{report}$ is a different radio access technology than the radio access technology $RAT_{collect}$.

According to exemplary embodiments the message which is sent from the UE to the network node contains a measurement receiver address which is encoded according to the rules of the RAT in which the measurement log is reported by the UE i.e. $RAT_{report}$. The message further comprises a RAT indicator which indicates the RAT in which measurements in the measurement log was collected by the UE i.e. $RAT_{collect}$. The RAT indicator may be encoded according to the rules of the $RAT_{report}$. Moreover, the message may contain a measurement log that may be encoded according to the rules of the $RAT_{collect}$.

The embodiments provide a solution where the reported measurement log is RAT-specific. The network node, e.g., an eNodeB comprised in a LTE system or a RNC comprised in a WCDMA system, that receives the measurement log can use the log for internal SON (Self-Optimizing/Organizing Network) purpose, such as optimising parameter settings (power levels, timers etc), correcting neighbouring cell lists and adjusting antenna propagations patterns. However, the network node may also forward the message comprising the measurement log to a receiving entity such as an OAM (Operation and Maintenance) Server. This may be performed without decoding the content of the measurement log. Furthermore, the embodiments provide the possibility for the network node to request delivery of an existing measurement log in the UE, before commanding the UE to start collecting a new measurement log when the UE has entered a new RAT.

A measurement report can contain a number of RAT-specific measurements and be sent from the UE to the network node using a control plane RRC (Radio Resource Control) message. In order to report the measurements in another RAT than in which the measurements were performed, there is a need to specify a format where the measurements that have been made in a first RAT, i.e. $RAT_{collect}$ can be received in a second RAT and that provides the network node in the second RAT, i.e. $RAT_{report}$, with a possibility to understand what to do with it, i.e. to which receiving entity the measurement log should be forwarded.

Figure 2:
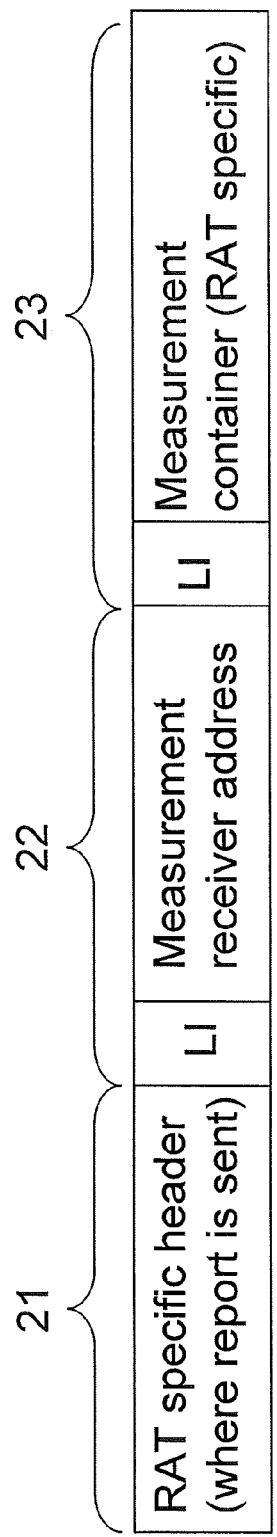
FIG. 2 shows an exemplary embodiment of a generic MDT measurement reporting structure for all RATs.

FIG. 2 illustrates an exemplary embodiment of a generic MDT measurement reporting message for all RATs in a wireless communication network that may be used by the UE to report the measurement logs to the network node. A message 20 comprises a header field 21 which is RAT specific, a measurement receiver address field 22 and a measurement container field 23. The header field 21 is encoded according to the rules of the second RAT in which the measurement log is reported by the UE, i.e. $RAT_{report}$. Thus, the network node receiving the message 20 is able to understand from which RAT the message is sent. Furthermore, the header field may comprise a RAT indicator which indicates the RAT in which measurements in the measurement log was collected by the UE, i.e. $RAT_{collect}$. The RAT indicator is encoded according to the rules of the second RAT in which the measurement log is reported by the UE, i.e. $RAT_{report}$. The measurements performed by the UE are placed in the measurement container field 23, which content need not to be understood by the intermediate receiver, i.e. the network node in $RAT_{report}$ in which a report including the message 20 is received. However, for the network node to be able to forward the received message to the right place, the measurement receiver address field 22 is used. The measurement receiver address field 22 comprises an address of the receiving entity, e.g. an IP-address plus any other related identification needed. Both the measurement container field 23 and the measurement receiver address field 22 can be of variable lengths and thus may each one of them need a length indicator LI in certain embodiments. However, if the length is fixed, no such information is needed. The length indicators may be included in the measurement container field 23 and the measurement receiver address field 22, respectively, as shown in FIG. 2. However, the length indicators LI may be placed in the header field 21 in some embodiments.

There could also be other ways of indicating the lengths of the container field 23 and the receiver address field 22, e.g., they could be of a fixed length and padding could be applied. Typically there would only be one measurement receiver address so the measurement receiver address field 22 would be of a fixed length, thus there would be no need for a specific length indicator for this field. For example, the Abstract Syntax Notation One (ASN.1) that describes data structures provides a set of formal rules for describing the structure of objects and may remove the need for a explicit length notation in the message content part (e.g. measurement results in the measurement report) by using a bit- or octet string notation, or other for describing the variable size of the RRC message and/or container. In this case, in order for the receiving side, e.g. the receiving entity, to decode the variable message, it may be required to define a set of predefined sizes (e.g. a list of sizes), for example message container sizes of 1, 2, . . . n in number of octets. The UE then may select a size larger than or equal to octets fitting the content part of the report and add padding when needed.

In an exemplary embodiment, measurements performed in a wireless communication system such as LTE can be reported in a WCDMA or a GSM/EDGE system and then forwarded to the correct place such as an OAM functionality, a measurement collection center or a trace collection center and/or to an eNodeB.

Figure 3:
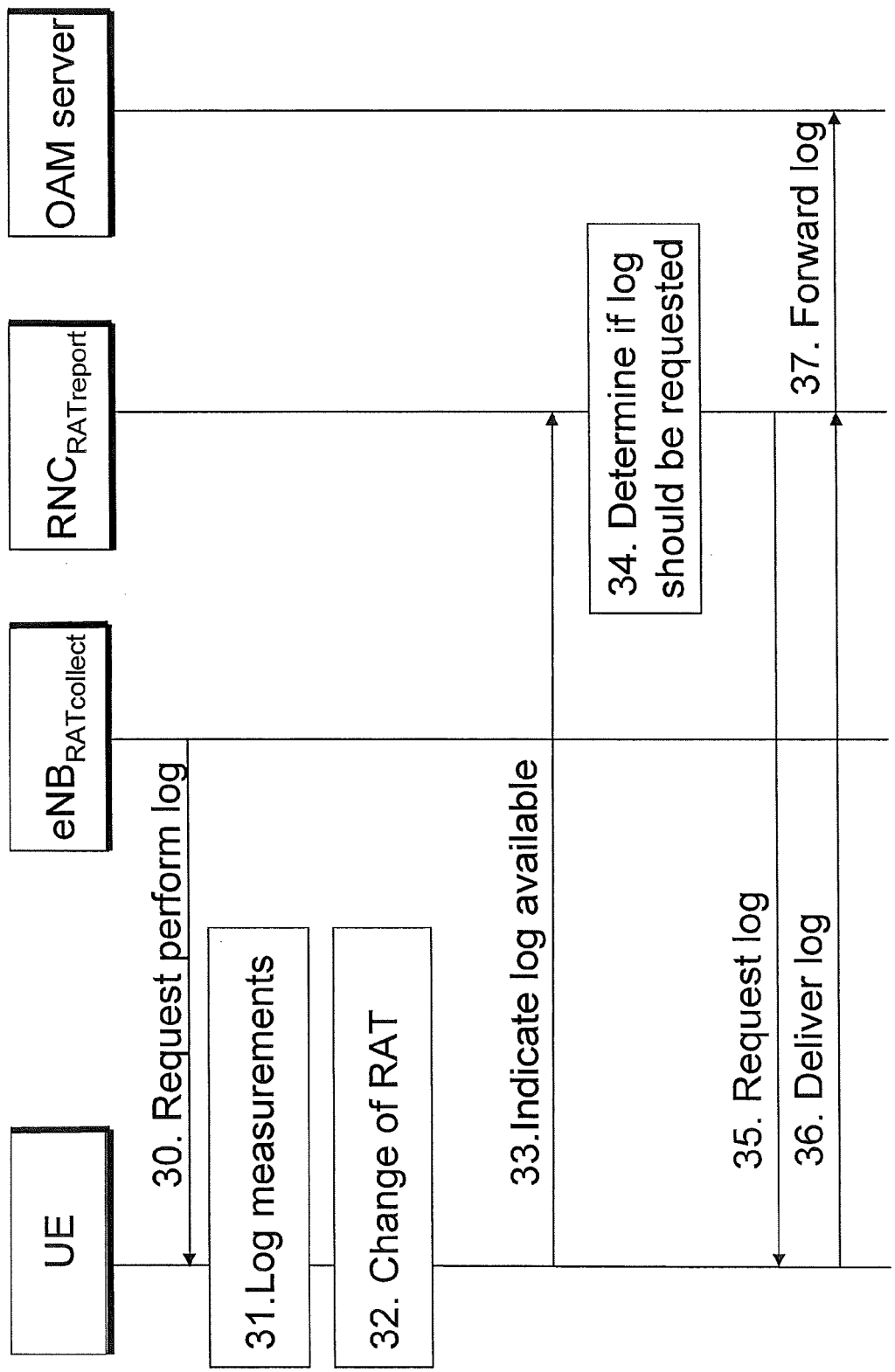
FIG. 3 is a signaling diagram schematically illustrating the signaling according to exemplary embodiments.

FIG. 3 is a signaling diagram schematically illustrating the signaling according to exemplary embodiments. A network node, e.g., an eNodeB, in a first RAT ($RAT_{collect}$), e.g., the RAT of Evolved Universal Terrestrial Radio Access Network (E-UTRAN), is comprised in a wireless communication system which communicates with and serves several UEs. The wireless communication system employs different RATs that overlap over a geographic area. The network node requests 30 a UE to start performing logging of measurement information. For example, the network node may request the UE to log downlink pilot signal strength measurements of serving cell or neighbour cell, downlink pilot signal quality measurements of serving cell or neighbour cell, GPS positioning data etc. The UE executes measurements and logs 31 the measurement information internally in a sequential manner, containing e.g. some hour of logged measurement information. However, the UE may not stay in one and the same RAT, i.e. the $RAT_{collect}$, during the logging of measurement information. Previously described, the change of RAT is mainly related to network deployment and service provisioning. An existing operator's network is often a combination of several RATs and designed to work together in order to maximize the service offerings and geographical coverage area in a cost efficient way. Thus, during the logging of measurement information the UE may change RAT 32 e.g. by performing a handover. After the handover the UE communicates with and is served by another network node in the wireless communication system e.g. a RNC (Radio Network Controller), in a second RAT ($RAT_{report}$), e.g. the RAT of GSM (Global System for Mobile Communications). Moreover, when the UE has logged measurement information the UE indicates 33 to the network node in the $RAT_{report}$ that it has an available measurement log. The network node then determines 34 whether is wants to request the measurement log. If it determines to request the measurement log it sends 35 a request of delivery to the UE. Thereupon the UE delivers 36 the measurement log to the network node in accordance with embodiments described in the following. The network node may then forward 37 the received measurement log to an OAM (Operation and Maintenance) or similar server comprised in the wireless communication system.

Figures 4A, 4B:
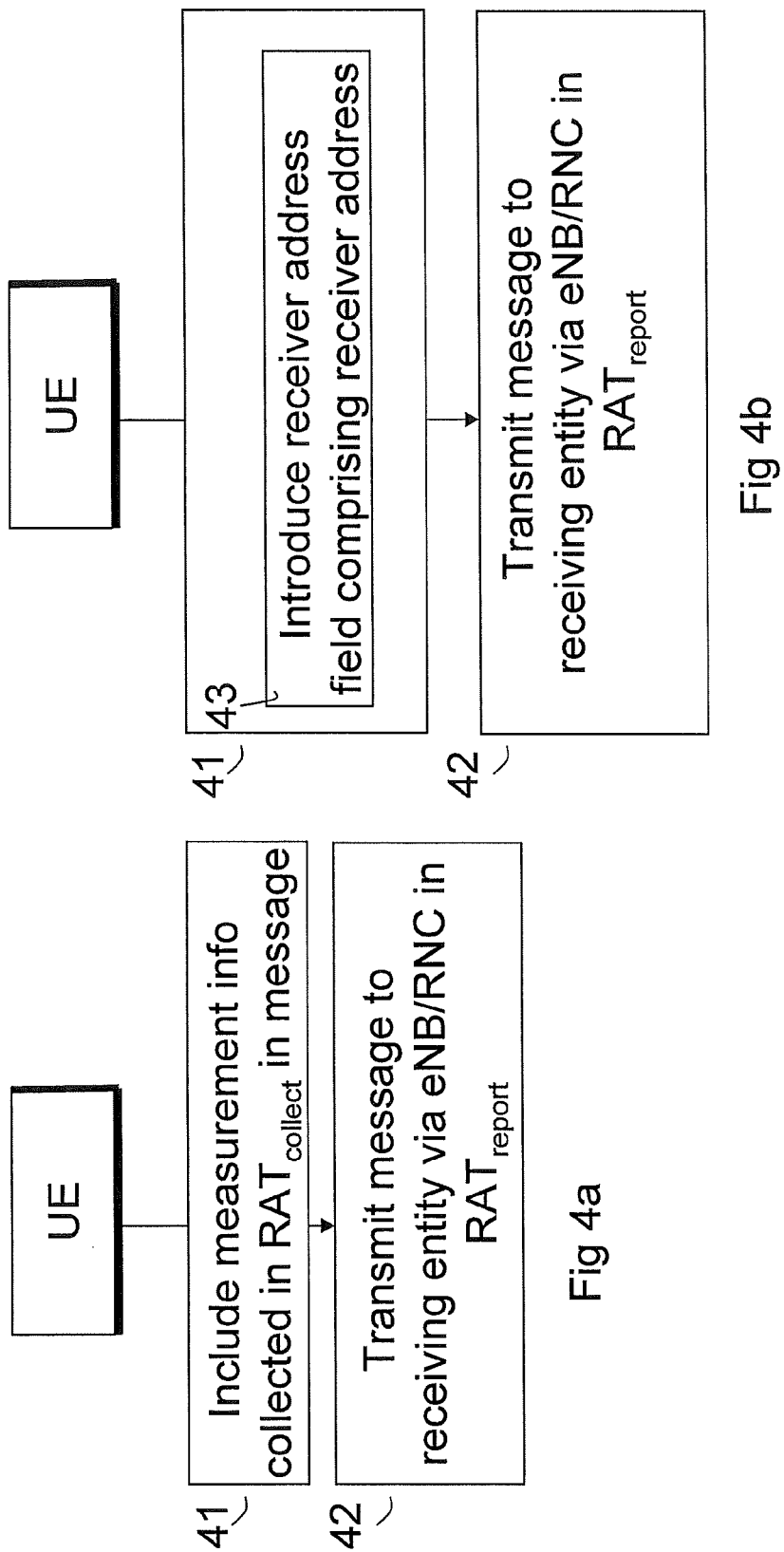

FIG. 4a is a flowchart of a method in a UE according to embodiments. When the UE has collected measurement information in the measurement log in a first RAT, i.e. $RAT_{collect}$, and received a request to deliver the measurement log to a network node in a second RAT, i.e. $RAT_{report}$, the UE starts preparing to deliver the measurement report. The UE includes 41 the logged measurement information in a message, wherein the measurement information is collected in $RAT_{collect}$. Then the UE transmits 42 the message to a receiving entity such as an OAM server or TCE (Trace Collection Entity). The receiving entity is also comprised in the wireless communication system. Furthermore, in an exemplary embodiment the receiving entity may be the network node or comprised in the network node.

Moreover, the message is sent via the network node utilizing the $RAT_{report}$. The message sent may be of a message format described in connection with FIG. 2. In an exemplary embodiment, illustrated in FIG. 4b, the UE introduces 43 a receiver address field in the message. The receiver address field comprises the address of the receiving entity and is possible to decode by at least the network node in the $RAT_{report}$. The address may be e.g. an IP-address plus any other related identification. In a further exemplary embodiment illustrated in FIG. 4c, the UE encapsulates 44 the measurement information in a container structure using a message format of the $RAT_{collect}$. Thus, the content may not be understood by the intermediate receiver, i.e. the network node in $RAT_{report}$. The UE may further introduce 45 a RAT indicator which indicates the $RAT_{collect}$ in which the measurement information is collected, which is illustrated in FIG. 4d. In this embodiment the UE further encodes 46 the RAT indicator using a message format of $RAT_{report}$. Thus, the network node in the second RAT i.e. $RAT_{report}$ may use the encapsulated measurement information for internal SON purposes as previously described. Moreover, the network node in $RAT_{report}$ may route the encapsulated measurement information to different receiving entities based on the RAT indicator. This also allows the receiving entity to know how to decode the encapsulated measurement information.

Moreover, a pre-defined set of container sizes are configured in the UE and the UE may further select a container size of the pre-defined set of container sizes which fits the measurement information in the container structure. Furthermore, the container may have a length which is variable and may comprise a length indicator indicating the length of the container. Also the receiver address field may have a length which is variable and may comprise a length indicator indicating the length of the address field. The length indicators may in some embodiments be comprised in the RAT header as previously described.

FIG. 5 is a flowchart of a method in a network node according to embodiments. The network node is comprised in the wireless communication system and configured to communicate with the UE utilizing a first RAT, i.e. $RAT_{report}$, in accordance with previously described embodiments. The network node receives 51 a message from the UE upon request of delivery of the measurement report. The message includes measurement information collected in a second RAT, i.e. $RAT_{collect}$. The network node forwards 52 the message to a receiving entity such as an OAM server or TCE comprised in the wireless communication system.

FIG. 6a is a flowchart of a method in a receiving entity according to embodiments. The receiving entity is comprised in the wireless communication system and configured to communicate with a network node comprised in the wireless communication system in accordance with previously described embodiments. The receiving entity, e.g. an OAM server or TCE, receives 61 a message from a UE via the network node in a first RAT, i.e. $RAT_{report}$. The message includes measurement information collected by the UE in a second RAT, i.e. $RAT_{collect}$. The receiving entity retrieves 62 the measurement information from the received message. In an exemplary embodiment illustrated in FIG. 6b the receiving entity decodes 63 a RAT indicator comprised in the message utilizing a message format of $RAT_{report}$. The RAT indicator indicates which RAT, i.e. $RAT_{collect}$, in which the measurement information is collected. In another exemplary embodiment, illustrated in FIG. 6c, the receiving entity retrieves 64 the measurement information from a container structure using a message format of $RAT_{collect}$ indicated by the RAT indicator.

In the described embodiments, the $RAT_{report}$ may be implemented in a LTE system and the $RAT_{collect}$ is implemented in a WCDMA or a GSM/EDGE system. The LTE system and the WCDMA or GSM/EDGE system is comprised in the wireless communication system. As a further example, the $RAT_{report}$ may be implemented in a WCDMA or a GSM/EDGE system and the $RAT_{collect}$ is implemented in a LTE system. The LTE system and the WCDMA or GSM/EDGE system is comprised in the wireless communication system.

Figure 7:
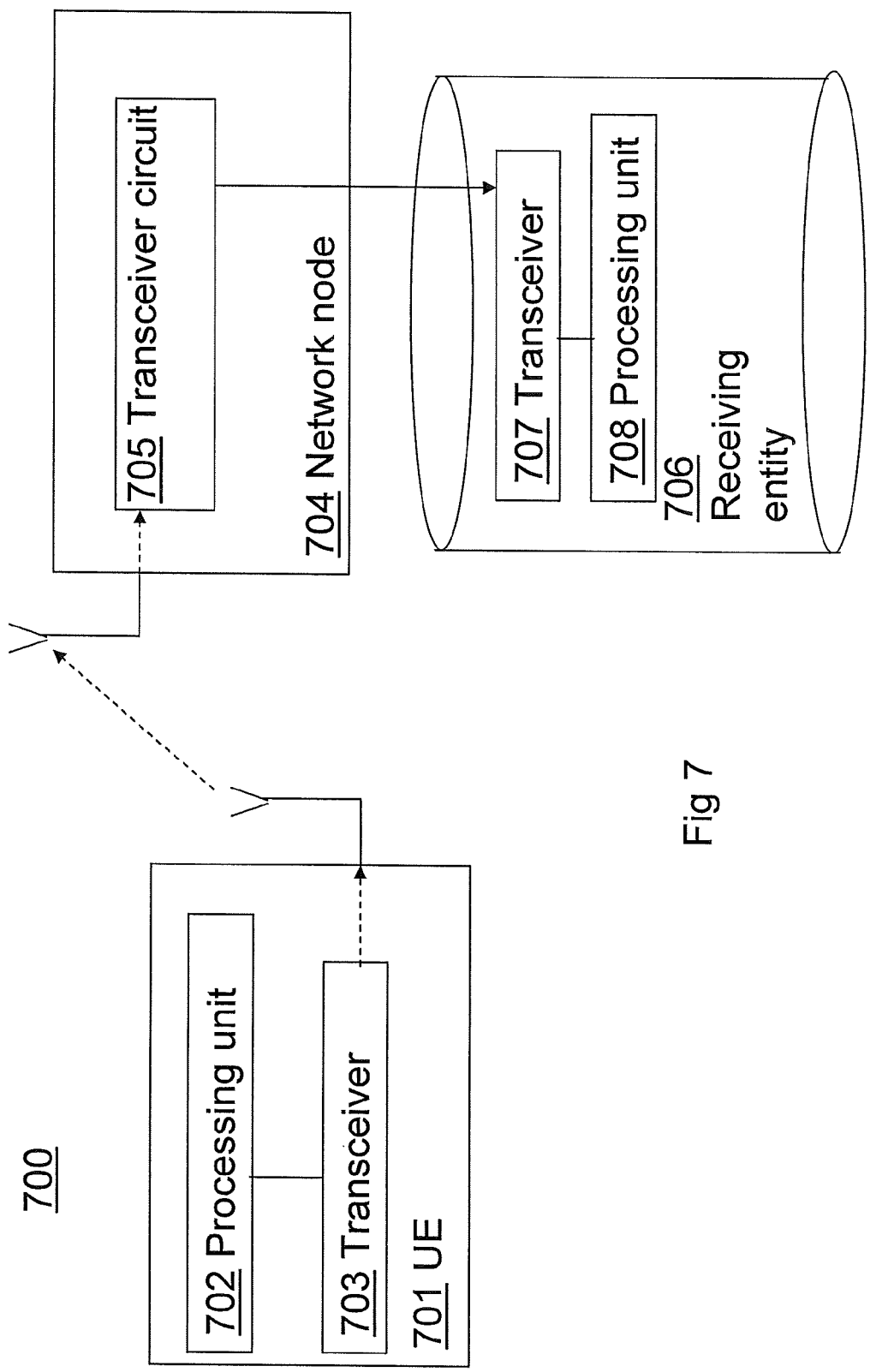
FIG. 7 is a block diagram illustrating the user equipment, the network node and the receiving entity according to embodiments.

FIG. 7 is a schematic block diagram schematically illustrating an exemplary UE 701 that is configured to communicate with an exemplary network node 704 comprised in a wireless communication system 700. The wireless communication system 700 may further include an exemplary receiving entity 706. The UE 701, the network node 704 and the receiving entity 706 can be implemented using various components, both hardware and software. It should be noted that the wireless communication system may comprise several network nodes which each may serve several UEs and several receiving entities. However, for simplicity reasons only one UE, one network node and one receiving entity are illustrated in the figure. For example, the UE 701 may include a processor unit 702, one or more storage devices (not shown), an operating system (not shown) running on the processor unit 702 as well as an application which reports measurement information in the manner previously described. Additionally, the network node 704 may also include a processor unit (not shown), one or more storage units (not shown), an operating system (not shown) running on the processor unit as well as an application which reports measurement information in the manner described above. Furthermore, the receiving entity may also comprise a processor unit 708, one or more storage units (not shown), an operating system (not shown) running on the processor unit as well as an application which receives measurement information reports in the manner described above.

In an exemplary embodiment the UE 701 comprises a processing unit 702 adapted to include measurement information in a message, wherein the measurement information is collected in a first RAT i.e. $RAT_{collect}$. It further includes a transceiver 703 adapted to transmit the message to the receiving entity 706 via the network node 704 in a second RAT i.e. $RAT_{report}$. The processing unit 702 may further be adapted to introduce a receiver address field in the message. The receiver address field comprises a receiver address which is possible to decode by at least the network node in $RAT_{report}$. Moreover, the processing unit 702 may be adapted to encapsulate the measurement information in a container structure using a message format of $RAT_{collect}$. The processing unit 702 of the UE may also be adapted to introduce a RAT indicator which indicates the $RAT_{collect}$ and encode the indicator using a message format of $RAT_{report}$. In an embodiment wherein a pre-defined set of container sizes are configured in the UE, the processing unit 702 is adapted to select a container size of the pre-defined set of container sizes which fits the measurement information in the container structure.

In an exemplary embodiment the network node 704 comprises a transceiver 705 adapted to receive a message from the UE 701. The message includes measurement information collected by the UE 701 in $RAT_{collect}$. The transceiver 705 is also adapted to forward the message to the receiving entity 706.

In an exemplary embodiment the receiving entity 706 comprises a transceiver 707 adapted to receive a message from a UE 701 via the network node 704 in $RAT_{report}$. The message includes measurement information collected by the UE 701 in $RAT_{collect}$. The receiving entity 706 further includes a processing unit 708 adapted to retrieve the measurement information from the received message. Furthermore, in one embodiment the processing unit may be adapted to decode a RAT indicator comprised in the message utilizing a message format of the $RAT_{report}$. The RAT indicator indicates the $RAT_{collect}$ in which the measurement information is collected. In yet another embodiment the processing unit 708 is further adapted to retrieve the measurement information from a container structure using a message format of the $RAT_{collect}$ indicated by the RAT indicator.

The embodiments may, of course, be carried out in other ways than those specifically set forth herein without departing from essential characteristics of the embodiments described. The present embodiments are to be considered in all respects as illustrative and not restrictive.

The invention claimed is:

1. A method in a user equipment for reporting measurement, the user equipment configured to communicate with a wireless communication system, the method comprising:
   including measurement information in a message, wherein the measurement information is collected in a first radio access technology (RAT), wherein the including measurement information in the message comprises encapsulating the measurement information in a container structure using a message format of the first RAT, and wherein a pre-defined set of container sizes are configured in the user equipment and a container size is selected from the pre-defined set of container sizes that fits the measurement information in the container structure; and
   transmitting the message utilizing a second RAT to a receiving entity in the wireless communication system via a network node, wherein the second RAT is different from the first RAT;
   wherein the including measurement information in a message comprises introducing a receiver address field in the message, the receiver address field comprising a receiver address of the receiving entity that is decodable by at least the network node using the second RAT.

2. The method of claim 1, wherein the receiver address is an Internet Protocol address.

3. The method of claim 1, wherein the including measurement information in a message comprises:
   introducing a RAT indicator which indicates the first RAT where the measurement information is collected; and
   encoding the indicator using a message format of the second RAT.

4. The method of claim 1, wherein the container has a length which is variable and comprises a length indicator.

5. The method of claim 4, wherein the length indicator is comprised in the RAT header.

6. The method of claim 1, wherein the receiver address field has a length which is variable and comprises a length indicator.

7. The method of claim 1, wherein the receiving entity is an Operation, Administration and Maintenance server or a Trace Collection Entity.

8. The method of claim 1:
   wherein the first RAT is implemented in a LTE system;
   wherein the second RAT is implemented in a WCDMA or a GSM/EDGE system;
   wherein the LTE system and the WCDMA or GSM/EDGE system are both in the wireless communication system.

9. A method in a network node for reporting measurement, the network node being in a wireless communication system and configured to communicate with a user equipment utilizing a first radio access technology (RAT), the method comprising:
   receiving a message from the user equipment, the message including measurement information collected by the user equipment in a second RAT, wherein the second RAT is different from the first RAT, wherein the received message comprises a receiver address of a receiving entity that is decodable by at least the network node using the first RAT, wherein the measurement information is encapsulated in the received message in a container structure using a message format of the second RAT, and wherein a size of the container structure fits the measurement information in the container structure;
   forwarding the message to the receiving entity in the wireless communication system.

10. The method of claim 9, wherein the received message comprises measurement information encapsulated in a container structure using a message format of the second RAT.

11. The method of claim 9, wherein the received message comprises a RAT indicator encoded using a message format of the first RAT, the RAT indicator indicating the second RAT where the measurement information is collected.

12. The method of claim 9, wherein the receiving entity is an Operation, Administration and Maintenance (OAM) server or a Trace Collection Entity (TCE).

13. The method of claim 9:
wherein the second RAT is implemented in a LTE system;
wherein the first RAT is implemented in a WCDMA or a GSM/EDGE system;
wherein the LTE system and the WCDMA or GSM/EDGE system are both in the wireless communication system.

14. A method in a receiving entity for reporting measurement, the receiving entity being in a wireless communication system and configured to communicate with a network node in the wireless communication system, the method comprising:
receiving a message from a user equipment via the network node utilizing a first radio access technology (RAT), the message including measurement information collected by the user equipment in a second RAT, wherein the second RAT is different from the first RAT, wherein the measurement information is encapsulated in the received message in a container structure using a message format of the second RAT, and wherein a size of the container structure fits the measurement information in the container structure;
decoding a RAT indicator present in the message utilizing a message format of the first RAT wherein the RAT indicator indicates the second RAT where the measurement information is collected, and
retrieving the measurement information from the received message.

15. The method of claim 14, wherein the retrieving the measurement information comprises retrieving the measurement information encapsulated in a container structure using a message format of the second RAT indicated by the RAT indicator.

16. The method of claim 14, wherein the receiving entity is an Operation, Administration and Maintenance server or a Trace Collection Entity.

17. The method of claim 14:
wherein the second RAT is implemented in a LTE system;
wherein the first RAT is implemented in a WCDMA or a GSM/EDGE system;
wherein the LTE system and the WCDMA or GSM/EDGE system are both in in the wireless communication system.

18. A user equipment for reporting measurement, the user equipment configured to communicate with a wireless communication system, the user equipment comprising:
a processing unit configured to include measurement information in a message, wherein the measurement information is collected in a first radio access technology (RAT), wherein the including measurement information in the message comprises encapsulating the measurement information in a container structure using a message format of the first RAT, and wherein a pre-defined set of container sizes are configured in the user equipment and a container size is selected from the pre-defined set of container sizes that fits the measurement information in the container structure;
a transceiver configured to transmit the message to a receiving entity in the wireless communication system via a network node utilizing a second RAT, wherein the second RAT is different from the first RAT, and wherein the transmitted message comprises a receiver address field, the receiver address field comprising a receiver address of the receiving entity that is decodable by at least the network node using the second RAT.

19. The user equipment of claim 18:
wherein the processing unit is configured to introduce a receiver address field in the message;
wherein the receiver address field comprises a receiver address of the receiving entity which is decodable by at least the network node using the second RAT.

20. The user equipment of claim 19, wherein the receiver address is an Internet Protocol address.

21. The user equipment of claim 18, wherein the processing unit is configured to:
introduce a RAT indicator in the message which indicates the first RAT where the measurement information is collected;
encode the RAT indicator using a message format of the second RAT.

22. The user equipment of claim 18, wherein the container has a length which is variable and comprises a length indicator.

23. The user equipment of claim 22, wherein the length indicator is comprised in the RAT header.

24. The user equipment of claim 18, wherein the receiver address field has a length which is variable and comprises a length indicator.

25. The user equipment of claim 18, wherein the receiving entity is an Operation, Administration and Maintenance server or a Trace Collection Entity.

26. The user equipment of claim 18:
wherein the first RAT is implemented in a LTE system;
wherein the second RAT is implemented in a WCDMA or a GSM/EDGE system;
wherein the LTE system and the WCDMA or GSM/EDGE system are both in the wireless communication system.

27. A network node for reporting measurement, the network node being in a wireless communication system and configured to communicate with a user equipment utilizing a first radio access technology (RAT), the network node comprising a transceiver configured to:
receive a message from the user equipment, the message including measurement information collected by the user equipment in a second RAT, wherein the second RAT is different from the first RAT, wherein the received message comprises a receiver address of the receiving entity that is decodable by at least the network node using the first RAT, wherein the measurement information is encapsulated in the received message in a container structure using a message format of the second RAT, and wherein a size of the container structure fits the measurement information in the container structure;
forward the message to a receiving entity in the wireless communication system.

28. The network node of claim 27, wherein the received message comprises a receiver address of the receiving entity which is decodable by at least the network node using the first RAT.

29. The network node of claim 27, wherein the received message comprises measurement information encapsulated in a container structure using a message format of the second RAT.

30. The network node of claim 27, wherein the received message comprises a RAT indicator encoded using a message format of the first RAT, the RAT indicator indicating the second RAT where the measurement information is collected.

31. The network node of claim 27, wherein the receiving entity is an Operation, Administration and Maintenance server or a Trace Collection Entity.

32. The network node of claim 27:
wherein the second RAT is implemented in a LTE system;
wherein the first RAT is implemented in a WCDMA or a GSM/EDGE system;
wherein the LTE system and the WCDMA or GSM/EDGE system are both in the wireless communication system.

33. A receiving entity for reporting measurement, the receiving entity being in a wireless communication system and configured to communicate with a network node in the wireless communication system, the receiving entity comprising:
 a transceiver configured to receive a message from a user equipment via the network node utilizing a first radio access technology (RAT), the message including measurement information collected by the user equipment in a second RAT, wherein the second RAT is different from the first RAT, wherein the measurement information is encapsulated in the received message in a container structure using a message format of the second RAT, and wherein a size of the container structure fits the measurement information in the container structure;
 a processing unit configured to decode a RAT indicator in the message utilizing a message format of the first RAT wherein the RAT indicator indicates the second RAT where the measurement information is collected, and to retrieve the measurement information from the received message.

34. The receiving entity of claim 33, wherein the processing unit is configured to retrieve the measurement information encapsulated in a container structure using a message format of the second RAT indicated by the RAT indicator.

35. The receiving entity of claim 33, wherein the receiving entity is an Operation, Administration and Maintenance server or a Trace Collection Entity.

36. The receiving entity of claim 33:
wherein the second RAT is implemented in a LTE system;
wherein the first RAT is implemented in a WCDMA or a GSM/EDGE system;
wherein the LTE system and the WCDMA or GSM/EDGE system are both in the wireless communication system.

* * * * *

UNITED STATES PATENT AND TRADEMARK OFFICE
CERTIFICATE OF CORRECTION

| | | |
|---|---|---|
| PATENT NO. | : 8,914,020 B2 | Page 1 of 1 |
| APPLICATION NO. | : 13/704017 | |
| DATED | : December 16, 2014 | |
| INVENTOR(S) | : Persson et al. | |

It is certified that error appears in the above-identified patent and that said Letters Patent is hereby corrected as shown below:

In the Specification

In Column 1, Line 35, delete "verification" and insert -- verification. --, therefor.

In Column 1, Line 48, delete "whether is" and insert -- whether it --, therefor.

In Column 7, Line 23, delete "whether is" and insert -- whether it --, therefor.

In the Claims

In Column 11, Line 44, in Claim 17, delete "in in the" and insert -- in the --, therefor.

Signed and Sealed this
Twenty-third Day of February, 2016

Michelle K. Lee
*Director of the United States Patent and Trademark Office*